(No Model.)
E. HILL.
METHOD OF SETTING AND HOLDING PLATE GLASS FOR BEVELING.
No. 506,401. Patented Oct. 10, 1893.
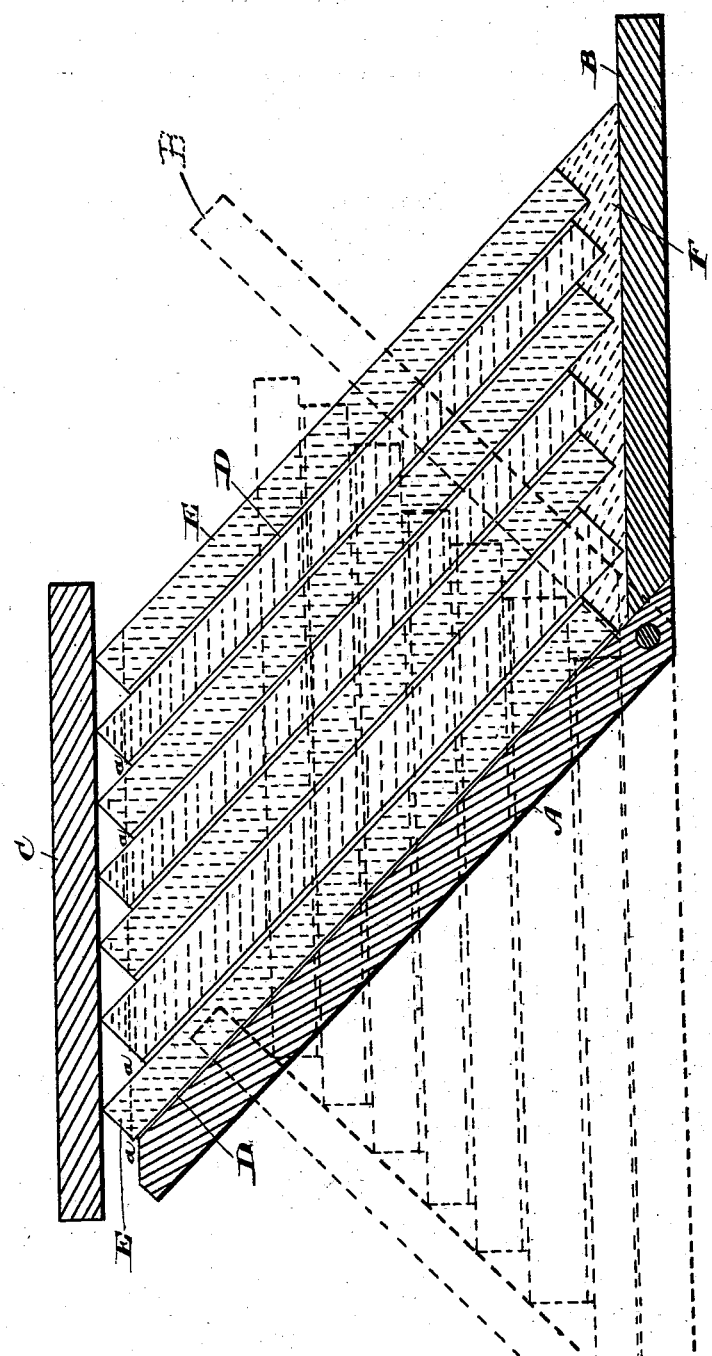
Witnesses.
A. E. Young.
E. R. Case.
Inventor.
Edwin Hill
by Fetherstonhaugh & Co
attys.

UNITED STATES PATENT OFFICE.

EDWIN HILL, OF TORONTO, CANADA.

METHOD OF SETTING AND HOLDING PLATE-GLASS FOR BEVELING.

SPECIFICATION forming part of Letters Patent No. 506,401, dated October 10, 1893.

Application filed December 21, 1892. Serial No. 455,883. (No model.)

*To all whom it may concern:*

Be it known that I, EDWIN HILL, manufacturer, of the city of Toronto, in the county of York, in the Province of Ontario, Canada, have invented certain new and useful Improvements in the Method of Setting and Holding Plate-Glass for Beveling, of which the following is a specification.

My invention relates to an improved method for beveling plate glass and the object of the invention is to provide a means whereby a number of plates of glass of unequal thicknesses may be held in such a position that they may be beveled at the same time and thus effect economy both in time and labor and it consists essentially in the novel steps of the method as hereinafter more particularly explained.

The drawing represents a section through a series of plates of glass, which are shown in position ready for the operation of the grinding or polishing machine.

It is well known in the art that after the glass has been cast into plates it has to be ground and polished. In the grinding and polishing of the plates they invariably come out from the grinding and polishing machine of different thicknesses. Heretofore in order to bevel these plates of glass of unequal thicknesses they had to be operated upon singly by the grinding machine being placed flat upon a horizontal table. This method of placing them necessarily involved much loss of time in beveling as the edge of each plate of glass had to be beveled separately. It is with a view to provide a means whereby a uniform bevel may be produced simultaneously on one of the edges of several plates of glass although they may be of unequal thicknesses that my invention is chiefly designed.

In carrying out my method it is necessary that the plates of glass should be supported in a slanting position as shown in the drawing but as the plates are of unequal thicknesses it will be seen that in order that a uniform bevel may be produced on each of the several plates of glass by the grinding machine the projecting corners of the edges which are to be ground down must be in alignment. These corners could not be supported in alignment upon a plain base as the lower projecting corners of the edges of the plates of glass, which are not being ground must on account of the unequal thicknesses of the glass be at unequal distances from the bottom supporting plate, B. It necessarily follows that some means must be provided whereby the projecting corners of the upper edges may be securely held in alignment during the process of beveling and the means by which this is accomplished I shall now describe.

I provide a supporting frame consisting of an end plate, A, and bottom plate, B. When the plate glass is to be placed in position the frame is tilted so that the end plate, A, lies in a horizontal position and the bottom plate, B, in an inclined position. The gage plate, C, or an equivalent therefor is also provided which is securely held in an inclined position. The positions of the frame and gage plate are shown by dotted lines in the drawing. I place upon the end plate, A, a sheet of material D, preferably of doe skin. Upon the top of this I place a plate of glass, E. Upon the plate of glass, E, I place another doe skin, D, and I place a plate of glass upon this doe skin also. I repeat this so that I have doe skins between each plate of glass and the one above it throughout the several plates of glass. Each of the plates are arranged so that the corner of the edge next the gage plate, C, abuts the gage plate. In this manner all the corners of the edges next the gage plate, C, are in alignment. I then fill in with plaster of paris or any other suitable plastic composition the space or spaces between the opposite edges of the plate and the bottom plate, B. The plates are preferably placed in position and the plaster filled in when the plates are horizontal as indicated by dotted lines in the drawing. They might however be arranged in position so that the corners of their upper edges would be in alignment by using the gage plate in its horizontal position and arranging the plates of glass in their slanting position.

Before putting in operation the grinding and polishing machines I allow the plaster of paris situated between the bottom edges of the plates of glass, F, and the bottom plate, B, to set and of course remove the gage plate, C. When the plates of glass have been arranged and secured in position so that the corners next the gage plate, C, abut the same and are consequently in alignment, the frame, A, B, is tilted so as to bring the bottom plate, B, to the horizontal and the plates of glass into a slanting position. In this position the frame is suitably held and it will be seen that the plates will be securely held so that their upper corners are in alignment. The operation of the grinding machine will therefore produce throughout the several plates of glass uniform bevels or bevels of equal width as indicated by dotted lines $a$—$a$ in the drawing.

Although I preferably provide both doe skins, D, and the plaster of paris, F, to hold the plates in position I find in practice that the gripping property of the doe skin upon the surface of the plates of glass of itself appears to hold the plates in proper position in relation to each other without the use of the plaster of paris during the process of grinding but in order to insure security of position of the plates in relation to each other I fill up the angular spaces between the bottom edges of the plates and the bottom plates, B, with plaster of paris. It will also be noticed that the doe skins might be dispensed with and the plates supported in position by means of the plaster of paris alone but in this case the powder produced by the grinding away of the corners during the process of beveling might in case of any unequal thickness in the surface plane of the abutting plates of glass work its way down between them and scratch or otherwise detrimentally affect the polished surface of the plates. For this reason I in practice find it preferable to use both together but I wish it to be understood that I lay claim to using either one without the other.

What I claim as my invention is—

1. The improvement in the art of producing a bevel on plates of glass, consisting in supporting a plurality of plates of glass of unequal thicknesses at any desired inclination, filling the spaces between the bottom edges of the plates and the supporting bed or plate with plaster of paris allowed to set and simultaneously grinding or polishing the projecting corners of the upper edges of the several plates until the desired bevel is produced as and for the purpose specified.

2. The improvement in the art of producing a bevel on plates of glass consisting in supporting a plurality of plates of glass of unequal thicknesses at any desired inclination, so that the upper projecting corners of the plates are in alignment by placing between the plates of glass or beneath each plate doe skins and filling the spaces between the bottom edges of the plates and the supporting bed or plate with plaster of paris allowed to set and simultaneously grinding or polishing the projecting corners of the upper edges of the several plates until the desired bevel is produced as and for the purpose specified.

3. The improvement in the art of producing a bevel on plates of glass of unequal thicknesses consisting in placing a plurality of plates of glass horizontally so that the projecting corners of the edges of the several plates are in alignment and filling up the unequal spaces between the opposite edges of the plates and the bottom plate or bed with plaster of paris allowing the plaster to set and elevating the plates to any desired inclination and simultaneously grinding or polishing the projecting corners of the upper edges of the several plates until the desired bevel is produced. as and for the purpose specified.

4. The improvement in the art of producing a bevel on plates of glass, consisting in placing a plurality of plates of glass horizontally, aligning the corners thereof at one end, securing the plates in their adjusted position, elevating the same to the desired inclination and finally grinding the projecting corners, substantially as described.

EDWIN HILL.

Witnesses:
B. BOYD,
H. G. S. YOUNG.